(Model.)
C. HUTCHINS.
HAME FASTENER.
No. 244,609.  Patented July 19, 1881.
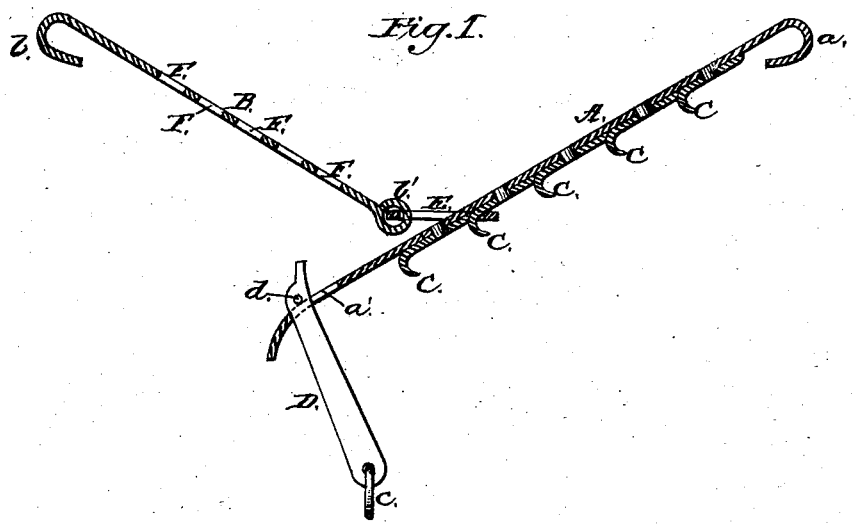
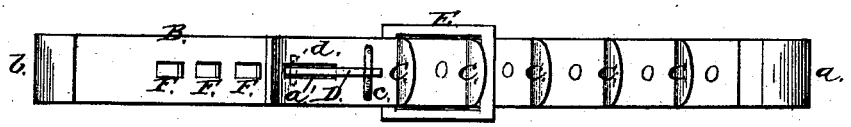
WITNESSES  
John A. Ellis  
James J. Sheehy
By his Attorneys Anderson & Smith
INVENTOR  
Chas. Hutchins

UNITED STATES PATENT OFFICE.

CHARLES HUTCHINS, OF FORT GIBSON, ASSIGNOR OF ONE-HALF TO JAMES S. STANDLY, OF TOBOXIE COUNTY, CHOCTAW NATION, IND. TER.

HAME-FASTENER.

SPECIFICATION forming part of Letters Patent No. 244,609, dated July 19, 1881.

Application filed December 11, 1880. (Model.)

*To all whom it may concern:*

Be it known that I, CHARLES HUTCHINS, a citizen of the United States, residing at Fort Gibson, in the Cherokee Nation, Indian Territory, have invented certain new and useful Improvements in Hame-Fasteners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a sectional view. Fig. 2 is a bottom view.

This invention relates to hame-fastenings; and it consists in the construction hereinafter described.

In the drawings hereto annexed, A is one portion, and B the other, which are to be clasped together. A consists of a flat bar having at one end the hook $a$ and at the other a slot, $a'$. Between said hook and slot, on the hook side of bar A, is a series of hooks or catches, C, made separate and bolted to bar A, or the metal of the bar might be punched out and turned up to form said hooks, the former construction being stronger. Inserted through slot $a'$ is a rod, D, having a loop, $c$, at one end and a pin, $d$, at the other.

B is a flat bar, having a hook, $b$, at one end and an eye, $b'$, at the other, in which eye is placed an angular loop, E. Between hook $b$ and eye $b'$ there are punched lengthwise in bar B elongated holes F.

In use these portions A B are hooked into the hame-rings, the hooks $a$ and $b$ being in the same direction, and bar A is then inserted through loop E until said loop catches upon one of the catches C, which holds the device firm.

To release the device the end of rod D having pin $d$ is inserted into one of the holes F, and bar B is moved toward the hooked end of bar A to slacken loop E on catch C, when it can be readily removed from said catch and slipped off of bar A.

What I claim is—

The bar A, having hook $a$, slot $a'$, and catches C, in combination with rod D, having pin $d$, and loop $c$, and bar B, having hook $b$, holes F, and loop E, the whole constructed and arranged substantially as described.

In testimony whereof I affix my signature in presence of two witnesses.

CHARLES HUTCHINS.

Witnesses:
J. S. SCOTT,
W. I. NASH.